United States Patent Office 2,831,830
Patented Apr. 22, 1958

2,831,830

SULFUR-CONTAINING RESINOUS PRODUCTS FROM POLYEPOXIDES

Carl W. Schroeder, Orinda, Calif., assignor to Shell Development Company, New York, N. Y., a corporation of Delaware No Drawing. Application May 24, 1954
Serial No. 432,031

20 Claims. (Cl. 260—47)

This invention relates to a new class of sulfur-containing resinous products. More particularly, the invention relates to novel sulfur-containing resinous products obtained from polyepoxides, and to their utilization, preferably in the preparation of pottings and adhesives.

Specifically, the invention provides new and particularly useful resinous products prepared by reacting a polyepoxide, and preferably a low molecular weight glycidyl polyether of a polyhydric alcohol or a polyhydric phenol, with an organic compound containing a single —SH group and one or more dissimilar functional groups reactive with epoxy groups, and particularly a carboxylic acid or sulfonic acid group, a hydroxyl group, aldehyde group, an amine or a substituted amine group.

It is an object of the invention to provide a new class of sulfur-containing resinous products. It is a further object to provide a new class of resinous sulfur-containing products from polyepoxides and a method for their preparation. It is a further object to provide resinous sulfur-containing products which are valuable in the preparation of adhesives and sealing compositions. It is a further object to provide resinous sulfur-containing products which may be used in the preparation of castings and pottings for electrical apparatus. It is a further object to provide sulfur-modified polyepoxide resins that have improved compatibility characteristics. It is a further object to provide sulfur-modified polyepoxides that are useful in the preparation of improved coating compositions. Other objects and advantages of the invention will be apparent from the following detailed description thereof.

It has now been discovered that these and other objects may be accomplished by the novel products of the invention comprising resinous products prepared by reacting a polyepoxide, and preferably a low molecular weight glycidyl polyether of a polyhydric alcohol or a polyhydric phenol, with an organic compound containing a single —SH group and one or more dissimilar functional groups known to react with epoxy groups, particularly a carboxyl group, a hydroxyl group, an aldehyde group, an amine or a substituted amine group. The sulfur-containing products prepared in this manner are promising adhesives and sealing compositions and are useful in the preparation of castings and pottings for electrical apparatus. These products, and particularly those prepared from the mercapto-substituted acids, such as mercapto-acetic acid, form very hard, flexible pottings which represent an improvement over the more brittle castings prepared from the polyepoxides by themselves.

The polyepoxides used in the preparation of the novel products of the invention include all those organic materials having at least two epoxy groups, i. e.

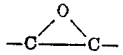

groups, per molecule. The polyepoxides may be saturated or unsaturated, aliphatic, cycloaliphatic, aromatic or heterocyclic and may be substituted if desired with substituents, such as for example, halogen atoms, ether radicals, and the like. They may also be monomeric or polymeric.

For clarity, many of the polyepoxides and particularly those of the polymeric type will be described throughout the specification and claims in terms of epoxy equivalent value. The term "epoxy equivalency" refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine at the boiling point for 20 minutes whereby the pyridinium chloride hydrochlorinates the epoxy groups to chlorohydrin groups. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyepoxide material consists of a single compound and all of the epoxy groups are intact, the epoxy equivalency will be integers, such as 2, 3, 4, and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

The monomeric-type polyepoxide compounds may be exemplified by the following: vinyl cyclohexene dioxide, butadiene dioxide, 1,4-bis(2,3-epoxypropoxy)benzene, 1,3-bis(2,3-epoxypropoxy)benzene, 4,4'-bis(2,3 - epoxypropoxy)diphenyl ether, 1,8 - bis(2,3 - epoxypropoxy)-octane, 1,4-bis(2,3-epoxypropoxy)cyclohexane, 4,4'-bis-(2 - hydroxy - 3,4 - epoxybutoxy)diphenyldimethylmethane, 1,3-bis(4,5-epoxypentoxy)-5-chlorobenzene, 1,4-bis-(3,4-epoxybutoxy)-2-chlorocyclohexane, diglycidyl ether, 1,3-bis(2-hydroxy-3,4-epoxybutoxy)benzene, 1,4 - bis(2-hydroxy-4,5-epoxypentoxy)benzene, and 1,2,3,4-tetra(2-hydroxy-3,4-epoxybutoxy)butane.

Other examples of this type include the glycidyl polyethers of polyhydric phenols obtained by reacting a polyhydric phenol with a great excess of a halogen-containing epoxide in the presence of an alkaline medium. Thus, polyether A described hereinafter, which is substantially 2,2-bis(2,3-epoxypropoxyphenyl)propane, is obtained by reacting bis-phenol, i. e. 2,2-bis-(4-hydroxyphenyl)propane, with an excess of epichlorohydrin as indicated below. Other polyhydric alcohols that can be used for this purpose include resorcinol, catechol, hydroquinone, methyl resorcinol, or polynuclear phenols, such as 2,2-bis(4 - hydroxyphenyl)butane, 4,4' - dihydroxybenzophenone, bis(4-hydroxyphenyl)ethane, and 1,5-dihydroxynaphthalene. The halogen containing epoxides may be exemplified by 3-chloro-1,2-epoxybutane, 3-bromo-1,2-epoxyhexane, and the like.

Still a further group of the polyepoxides comprises the polyepoxy polyethers obtained by reacting, preferably in the presence of an acid-acting compound, such as hydrofluoric acids, one of the aforedescribed halogen-containing epoxides with a polyhydric alcohol, and subsequently treating the resulting product with an alkaline component. Polyhydric alcohols that may be used for this purpose include glycerol, propylene glycol, ethylene glycol, diethylene glycol, butylene glycol, hexanetriol, sorbitol, mannitol, pentanetriol, pentaerythritol, di- and tripentaerythritol, polyglycerol, dulcitol, inositol, carbohydrates, methyltrimethylolpropane, 2,6-octanediol, tetrahydroxycyclohexane, 2-ethylhexanetriol-1,2,6, glycerol methyl ether, glycerol allyl ether, polyvinyl alcohol and polyallyl alcohol, and mixtures thereof. Such polyepoxides may be exemplified by glycerol triglycidyl ether, mannitol tetraglycidyl ether, pentaerythritol tetraglycidyl ether and sorbitol tetraglycidyl ether.

A further group of the polyepoxides comprises the polyepoxy polyesters obtained by esterifying a polycarboxylic acid with an epoxy-containing alcohol, such as, for example, the diglycidyl ester of adipic acid, the diglycidyl ester of maleic acid, and the diglycidyl ester of succinic acid.

Other polyepoxides include the polyepoxypolyhydroxy polyethers obtained by reacting, preferably in an alkaline medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A group of polymeric-type polyepoxides comprises the hydroxy-substituted polyepoxy polyethers obtained by reacting, preferably in an alkaline medium, a slight excess, e. g., .5 to 3 mol excess, of a halogen-containing epoxide as described above, with any of the aforedescribed polyhydric phenols, such as resorcinol, catechol, bis-phenol, bis(2,2'-dihydroxy-dinaphthyl)methane, and the like.

Other polymeric polyepoxides include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compounds, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl 2,3-epoxpropyl ether), poly(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl)ether, allyl glycidyl ether-vinyl acetate copolymer and poly(4-glycidyl oxystyrene).

The preparation of polymers of this type may be illustrated by the following example showing the preparation of poly(allyl glycidyl ether).

PREPARATION OF POLYMERS OF GLYCIDYL ETHERS

Polymer A

About 100 parts of allyl glycidyl ether was combined with an equal amount of benzene and the resulting mixture heated at 155° C. in the presence of 3% ditertiary-butyl peroxide. The solvent and unreacted monomer were then removed by distillation. The poly(allyl glycidyl ether) obtained as the resulting product had a molecular weight of about 481–542 and an epoxide value of 0.50 eq./100 g. For convenience, this product will be referred to hereinafter as polymer A.

Particularly preferred members of the above-described group comprises the polymers of the 2-alkenyl glycidyl ethers having a molecular weight betwen 300 and 1000 and an epoxy equivalency greater than 1.0, and preferably between 1.2 and 6.0.

Coming under special consideration are the polyglycidyl polyethers of polyhydric alcohols obtained by reacting the polyhydric alcohol with epichlorohydrin, preferably in the presence of 0.1% to 5% by weight of an acid-acting compound, such as boron trifluoride, hydrofluoric acid, stannic chloride or stannic acid. This reaction is effected at about 50° C. to 125° C. with the proportions of reactants being such that there is about one mole of epichlorohydrin for every equivalent of hydroxyl group in the polyhydric alcohol. The resulting chlorohydrin ether is then dehydrochlorinated by heating at about 50° C. to 125° C. with a small, e. g., 10% stoichiometrical excess of a base, such as sodium aluminate.

The preparation of these preferred polyglycidyl ethers of polyhydric alhocols may be illustrated by the following example showing the preparation of a glycidyl polyether of glycerol.

PREPARATION OF GLYCIDYL POLYETHERS OF POLYHYDRIC ALCOHOLS

Polyether B

About 276 parts (3 mols) of glycerol was mixed with 832 parts (9 mols) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for up to 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in dioxane solution. The epoxy equivalency of this product was 2.13. For convenience, this product will be referred to hereinafter as polyether B.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 170 and 1000.

Also of special importance are the monomeric and polymeric glycidyl polyethers of dihydric phenols, obtained by reacting epichlorohydrin with a dihydric phenol in an alkaline medium. The monomeric product of this type may be represented by the general formula

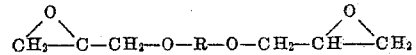

wherein R represents a divalent hydrocarbon radical of the dihydric phenol. The polymeric products will generally not be a single simple molecule but will be a complex mixture of glycidyl polyethers of the general formula

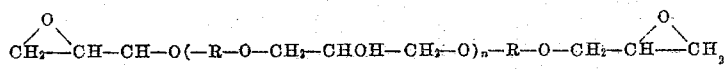

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value of $n$ to be an average which is not necessarily zero or a whole number. The polyethers may in some cases contain a very small amount of material with one or both of the terminal glycidyl radicals in hydrated form.

The aforedescribed preferred glycidyl polethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of the dihydric phenols will be illustrated below.

PREPARATION OF GLYCIDYL POLYETHERS OF DIHYDRIC PHENOLS

*Polyether C*

About 2 mols of bis-phenol was dissolved in 10 mols of epichlorohydrin and 1 to 2% water added to the resulting mixture. The mixture was then brought to 80° C. and 4 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g., and an epoxy equivalency of 1.75. For convenience, this product will be referred to hereinafter as polyether C.

*Polyether D*

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semisolid having a melting point of 27° C. by Durrans' mercury method and a molecular weight of 483. The product had an epoxy value of 0.40 eq./100 g., and an epoxy equivalency of 1.9. For convenience, this product will be referred to as polyether D.

*Polyether E*

About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at 130° C. The Durrans' mercury method melting point of the resulting product is 52° C. and the molecular weight is about 710. The product has an epoxy value of 0.27 eq./100 g. and an epoxy equivalency of 1.9.

Particularly preferred members of the above-described group are the glycidyl polyethers of the dihydric phenols, and especially bis-phenol, i. e. 2,2-bis(4-hydroxyphenyl)-propane.

The glycidyl polyethers of polyhydric phenols obtained by condensing the polyhydric phenols with epichlorohydrin are also referred to as "ethoxyline" resins. See Chemical Week, vol. 69, page 27, for September 8, 1951.

The materials to be reacted with the above-described polyepoxides comprise the organic compounds possessing a single —SH group and one or more dissimilar functional groups reactive with epoxy groups. The functional groups reactive with epoxy groups includes, among others, carboxylic acid and sulfonic acid groups, anhydride groups, amines and substituted amine groups, aldehyde groups, hydroxyl groups, actylenic groups, and the like. The organic compounds substituted with the —SH group and these other functional groups may be monomeric or polymeric and may be substituted if desired with other substituents such as halogen atoms, ether and ester groups, alkenyl radicals and the like.

Examples of these mercapto-substituted organic compounds include, among others, mercaptoacetic acid (thioglycollic acid), 3-mercaptopropionic acid, 4-mercaptobutyric acid, 2-mercaptopropionic acid, alpha-mercaptocaprylic acid, alpha-mercaptolauric acid, beta-mercaptomyristic acid, alpha-mercaptopalmitic acid, mercaptoundecylic acid, mercaptomalonic acid, mercaptosuccinic acid, 2-mercapto-1,2,4-butanetricarboxylic acid, mercaptostearic acid, mercaptobenzoic acid, mercaptophthalic acid, mercaptoisophthalic acid, mercaptobenzenesulfonic acid, mercaptotoluenesulfonic acid, mercaptoethanol, 3-mercapto pentanol-1, mercaptooctadecenol-1, 3-mercapto-4-hydroxyoctanoic acid, mercaptopropylamine, 3-mercapto-6-aminohexane, 4-mercapto-5-aminooctane, N-butyl mercaptobenzamide, aminobenzenethiol, mercaptoacetanilide, 3-chloro-5-mercaptobenzamide, 3-mercaptopropionaldehyde, 3-mercaptobutyraldehyde, and mercaptobenzothiozoline.

Preferred mercapto-substituted organic compunds comprise the mercapto-substituted monocarboxylic and polycarboxylic acids, mercapto-substituted sulphonic acids, mercapto-substituted aliphatic and cycloaliphatic alcohols, mercapto-substituted phenols, mercapto-substituted aliphatic and cycloaliphatic amines, N-substituted mercapto amines, and mercapto-substituted aldehydes, preferably containing no more than 30 carbon atoms, such as, for example, mercaptoacetic acid, mercaptobenzoic acid, mercaptophthalic acid, mercaptobenzenesulfonic acid, mercaptoethanol, merecaptooctadecanol, mercaptocyclohexanol, mercaptocyclohexanediol, mercaptobutyrylamine, mercaptohexylamine, N-butyl mercaptooctylamine, mercaptopropionaldehyde, mercaptobutyraldehyde, mercaptoadipaldehyde, and the like.

Particularly preferred mercapto-substituted organic compounds to be reacted with the polyepoxides include those of the formula HS—R—X wherein R is a bivalent hydrocarbon radical, oxahydrocarbon radical, thiahydrocarbon radical and disulfidehydrocarbon radical (hydrocarbon containing a —SS— linkage), and X is a member of the group of —COOH, —SO$_3$H, —OH, —NH$_2$, —NHR$_1$ (wherein R$_1$ is a hydrocarbon radical), and

radicals, said compounds preferably containing no more than 18 carbon atoms.

Coming under special consideration, particularly because of the superior flexible products prepared therefrom are the mercapto-substituted carboxylic acids and mercapto-substituted amines.

The quantity of reactants to be used in producing the novel products may vary over a wide range depending upon the nature of the desired product. In general, 100 parts of the polyepoxide will be combined with from 5 parts to 100 parts of the mercapto-substituted organic compound. The more flexible products are obtained when the mercapto-substituted organic compound is employed in amounts varying from about 5 parts to 50 parts per 100 parts of the polyepoxide. Products having more reactive groups for further cross-linking are obtained when the mercapto-substituted compounds are employed in amounts varying from 50 to 100 parts per 100 parts of polyepoxide. Unless otherwise indicated, parts are parts by weight.

The reaction between the polyepoxide and the mercapto-substituted compound may be accomplished by merely bringing the reactants together in a suitable reaction vessel. The temperature employed during the reaction may vary over a wide range depending upon the desired rate of reaction and the particular reactants selected. In some cases, the polyepoxides and the mercapto-substituted compound are quite reactive and the reaction proceeds at a satisfactory rate at or near room temperature. In other instances, the reaction is quite slow and it is usually desirable to employ temperatures such as of the order of 40° C. to 100° C. to speed up the reaction. In general, temperatures used in the reaction may vary from about 15° C. to 100° C.

The reaction is preferably conducted under atmospheric pressure but it may be advantageous in some instances to employ subatmospheric or superatmospheric pressures.

The reaction may be conducted in the presence or absence of solvents or diluents. The solvent if employed may be a solvent for the reactants and the resinous product or a solvent for the reactants and a non-solvent for the resinous products. Suitable solvents include toluene, benzene, dioxane, ethyl alcohol, butyl ether, and the like and mixtures thereof.

If solvents or diluents are employed in the reaction, or if excess reactants are utilized, they may be removed by any suitable means, such as distillation, extraction, and the like.

The products of the present invention will vary in physical form depending upon the nature of the reactants and proportions selected. If the mercapto-substituted organic compound is very reactive and is employed in smaller amounts as indicated above, the resulting product will be a hard, flexible solid. On the other hand, if the mercapto-substituted organic compound is less reactive and/or is employed in excess, the product will generally be viscous liquid to soft solid.

The products obtained by the use of the more reactive mercapto-substituted organic compounds, such as for example, the mercapo-substituted acids, are particularly useful as pottings or castings for electrical apparatus. These products are generally prepared by mixing the polyepoxide and mercapto-substituted compound together, pouring the mixture in the desired mold or casting containing the electrical wires or apparatus and then allowing the mixture to stand. After a short period, the mixture sets up to form the desired hard flexible casting. Heat as described above may also be applied to hasten the cure.

The products of the invention obtained from the use of the less reactive mercapto-substituted organic compounds may also be used to prepare pottings and castings as by the application of more strenous curing conditions or by the application of additional curing agents, such as amines, anhydrides, polymercaptans, and the like.

The products of the invention obtained from the above-described mercapto-substituted organic compounds may also be employed in the preparation of improved surface coating compositions of the air drying or baking type. In utilizing the products in this application, it is generally desirable to combine the polyepoxide, mercapto-substituted organic compound, and, if necessary, curing agent, with the desired solvents or diluents and optionally other film-forming materials, and then applying the resulting mixture to the surface to be coated. The coatings prepared in this manner are allowed to set to a hard finish or heat may be applied to hasten the cure.

The resinous products of the invention may also be employed in the preparation of valuable adhesive and impregnating compositions. In utilizing the products for these applications, it is generally desirable to combine the polyepoxide and the mercapto-substituted organic compound with a suitable solvent or diluent, such as benzene, toluene, acetonitrile, propionitrile, crotonitrile, benzonitrile, and the like, and mixtures thereof, so as to form a spreadable fluid and homogeneous mixture, additional curing agents added if desired, and then applying the resulting mixture to the desired surface. Adhesive compositions prepared in this manner are suitable for uniting various surfaces such as wood to wood, wood to metal, metal to metal, resins to resins, or any combination thereof. After the application has been made, the adhesive may be allowed to set at room temperature or heat may be applied to hasten the cure.

The resinous products of the invention and/or their partially or completely cured products also find application as intermediates in the preparation of other valuable chemical compositions. As they possess free hydroxyl groups formed by the opening of the epoxide groups, they may be further reacted with monofunctional agents, such as monocarboxylic acids, to produce derivatives that are valuable as plasticizers, lubricating oil additives and the like. Such acids may be exemplified by acetic, butyric, caproic, capric, stearic, palmitic, lauric, myristic, benzoic, isopropylbenzoic acid, toluic acid, acids derived from the drying oils and semi-drying oils as acids derived from linseed, soyabean, perilla, oiticica, tung, walnut, dehydrated castor oil, as well as rosin acids, such as abietic acid, and the like.

The resinous products of the invention may also be reacted with other reagents that act to cross-link the molecule through the hydroxyl groups, such as diisocyanates, dialdehydes, polycarboxylic acids, anhydrides, amine-aldehyde resins, and the like.

To illustrate the manner in which the invention may be carried out, the following examples are given. It is to be understood that the examples are for the purpose of illustration and the invention is not to be regarded as limited to any of the specific compounds or combinations recited therein. Unless otherwise specified, parts disclosed in the examples are parts by weight.

EXAMPLE I

About 100 parts of polyether B described above was combined with 25 parts of mercaptoacetic acid and the mixture heated at 100° C. for several hours. At the end of the heating period, the product was a hard rubbery casting.

The hard rubbery product having related properties was obtained by replacing the glycidyl polyether of glycerol with equivalent amounts of polymer A described above.

EXAMPLE II

About 100 parts of polyether B described above was combined with 25 parts of mercaptosuccinic acid and the mixture heated at 50° C. for several hours. At the end of the heating period, the product was a solid rubbery casting.

A product having similar properties is obtained by replacing polyether B described above with equivalent amounts of polymer A described above.

EXAMPLE III

About 100 parts of polyether B described above was combined with 10 parts of aminobenzenethiol and the mixture heated at 100° C. for several hours. The product was then a thick viscous liquid. When heated with 20 parts of amine-formaldehyde resin, the mixture set up to a hard solid casting.

EXAMPLE IV

About 100 parts of polyether C was combined with 25 parts of mercaptoacetic acid and the mixture heated at 100° C. for several hours. The resulting product was a rubbery solid.

Similar products are obtained by replacing the polyether C in the above-described process with equivalent amounts of each of the following: Polymer A, polyether D, diglycidyl ether and bis(2,3-epoxypropyl)sulfide.

EXAMPLE V

About 100 parts of polyether B described above was combined with 30 parts of mercaptobenzoic acid and the mixture heated at 50° C. for several hours. At the end of the heating period, the product was a thick viscous liquid. When heated with 20 parts of a urea-formaldehyde resin, the mixture set to a hard solid product.

Products having related properties are obtained by replacing the mercaptobenzoic acid in the above process with equivalent amounts of each of the following: mercaptobenzene-sulfonic acid and mercaptotoluene-sulfonic acid.

EXAMPLE VI

About 100 parts of polyether B described above is combined with 40 parts of mercaptobutyraldehyde and the mixture heated at 50° C. for several hours. At the end of the heating period, the product is a thick viscous liquid. After addition of 20 parts of a urea-formaldehyde resin and heating, the mixture set up to a hard solid.

Products having related properties are obtained by replacing the mercaptobutyraldehyde with equivalent amounts of each of the following: mercaptopropionaldehyde and mercaptobenzothiozoline.

EXAMPLE VII

About 100 parts of polyether B described above is combined with 40 parts of p-mercaptophenol and the mixture heated to 50° C. At the end of the heating period, the product is a flexible solid.

EXAMPLE VIII

A potting composition is prepared by mixing 100 parts of polyether C and 30 parts of mercaptopropionic acid. This mixture is placed in a mold containing coiled copper wire and the filled mold placed in a force draft oven at 65° C. In a few hours, the mixture has set to a hard rubbery solid.

EXAMPLE IX

An adhesive composition is prepared by combining 85 parts of polyether C with 15 parts of allyl glycidyl ether and 10 parts of mercaptoacetic acid and 2,4,6-tri(dimethylaminomethyl)phenol. This mixture is applied as glue to laminated phenolic blocks. The adhesive cures in a short period to form a laminate having good strength.

I claim as my invention.

1. A sulfur-containing resinous product obtained by heating and reacting 100 parts of a polyepoxide having at least two

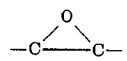

groups with from 5 to 100 parts of an organic compound possessing a single —SH group and at least one other functional group reactive with epoxy groups.

2. A sulfur-containing resinous product as defined in claim 1 wherein the polyepoxide is a glycidyl polyether of a member of the group consisting of polyhydric alcohols and polyhydric phenols, which glycidyl polyether has an epoxy equivalency greater than 1.0 and a molecular weight above 170.

3. A sulfur-containing resinous product as defined in claim 1 wherein the polyepoxide is glycidyl polyether of glycerol.

4. A sulfur-containing resinous product as defined in claim 1 wherein the polyepoxide is a glycidyl polyether of a dihydric phenol.

5. A sulfur-containing resinous product as defined in claim 1 wherein the organic compound containing the —SH group is a monomercapto-substituted carboxylic acid.

6. A sulfur-containing resinous product as defined in claim 1 wherein the organic compound containing the —SH group is a mercapto-substituted sulfonic acid.

7. A sulfur-containing resinous product as defined in claim 1 wherein the organic compound containing the —SH group is an amino-substituted mercaptan.

8. A sulfur-containing resinous product as defined in claim 1 wherein the organic compound containing the —SH group is a mercapto-substituted phenol.

9. A sulfur-containing resinous product as defined in claim 1 wherein the organic compound containing the —SH group is mercaptoacetic acid.

10. A sulfur-containing resinous product obtained by heating and reacting 100 parts of a polyepoxide having terminal

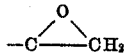

groups and an epoxy equivalency greater than one, with from 5 to 100 parts of an organic compound possessing a single —SH group and at least one dissimilar member of the group consisting of —COOH, —SO₃H, —OH, —NH₂, —NHR, and

radicals, wherein R is a lower alkyl radical.

11. A product as defined in claim 10 wherein the organic compound possessing a single —SH group and at least one dissimilar group is a monomercapto-substituted carboxylic acid.

12. A product as defined in claim 10 wherein the organic compound possessing a single —SH group and at least one dissimilar group is a monomercapto-substituted phenol.

13. A product as in claim 10 wherein the organic compound possessing a single —SH group and at least one dissimilar group is mercaptobenzoic acid.

14. A product as in claim 10 wherein the organic compound possessing a single —SH group and at least one dissimilar group is a mercaptoaminobenzene.

15. A product as in claim 10 wherein the organic compound possessing a single —SH group and at least one dissimilar group is mercaptoacetic acid.

16. A method for preparing new sulfur-containing resinous products which comprises heating and reacting 100 parts of a polyepoxide having at least two

groups with from 5 to 100 parts of an organic compound possessing a single —SH group and at least one other functional group reactive with epoxy groups.

17. A process as described in claim 16 wherein the polyepoxide is a glycidyl polyether of a member of the group consisting of polyhydric alcohols and polyhydric phenols, which glycidyl polyether has an epoxy equivalency greater than 1.0 and a molecular weight above 170.

18. A process as described in claim 16 wherein the polyepoxide is a glycidyl polyether of a polyhydric alcohol and the organic compound containing a single —SH group is a monomercapto-substituted carboxylic acid.

19. A process as in claim 16 wherein the organic compound containing a single —SH group is a monomercapto-substituted amine.

20. A process as in claim 16 wherein the organic compound containing a single —SH group is mercaptoacetic acid.

References Cited in the file of this patent

UNITED STATES PATENTS 2,129,709 Schuette et al. _____ Sept. 13, 1938
2,615,008 Greenlee _____ Oct. 21, 1952